US009219615B2

(12) United States Patent
Kuo et al.

(10) Patent No.: US 9,219,615 B2
(45) Date of Patent: Dec. 22, 2015

(54) REMOTE INFORMATION COMMUNICATION SYSTEM AND LINKING METHOD THEREOF

(75) Inventors: Chi-Ming Kuo, Taipei (TW); Yu-Li Kao, Taipei (TW); Chien-Chih Yang, Taipei (TW); Sheng-Fu Chang, Taipei (TW)

(73) Assignee: Throughtek Co., Ltd., Taipei (TW)

( * ) Notice: Subject to any disclaimer, the term of this patent is extended or adjusted under 35 U.S.C. 154(b) by 302 days.

(21) Appl. No.: 13/293,506

(22) Filed: Nov. 10, 2011

(65) Prior Publication Data

US 2012/0198040 A1 Aug. 2, 2012

(30) Foreign Application Priority Data

Jan. 28, 2011 (TW) .............................. 100129888 A
Jan. 28, 2011 (TW) .............................. 100201960 U

(51) Int. Cl.
*G06F 15/173* (2006.01)
*H04L 12/28* (2006.01)
*H04L 12/24* (2006.01)
*H04L 29/12* (2006.01)

(52) U.S. Cl.
CPC ............ *H04L 12/2818* (2013.01); *H04L 41/00* (2013.01); *H04L 61/2076* (2013.01); *H04L 61/256* (2013.01); *H04L 61/2539* (2013.01)

(58) Field of Classification Search
CPC . G06F 15/173; H04L 61/2539; H04L 61/256; H04L 61/2076
USPC .......................... 709/203, 206, 223, 224, 225
See application file for complete search history.

(56) References Cited

U.S. PATENT DOCUMENTS

| 6,373,851 | B1 | 4/2002 | Dadario |
| 6,373,857 | B1 | 4/2002 | Ma |
| 7,089,027 | B1 | 8/2006 | Welch et al. |
| 8,180,891 | B1 * | 5/2012 | Harrison ....................... 709/224 |
| 2003/0105854 | A1 * | 6/2003 | Thorsteinsson et al. ...... 709/223 |
| 2004/0186908 | A1 | 9/2004 | Amdahl et al. |
| 2005/0018620 | A1 | 1/2005 | Berndt et al. |
| 2005/0047379 | A1 | 3/2005 | Boyden et al. |
| 2008/0247381 | A1 | 10/2008 | Bohm et al. |
| 2009/0100309 | A1 | 4/2009 | Zheng |
| 2010/0185771 | A1 * | 7/2010 | Gurun et al. ................... 709/227 |
| 2010/0274859 | A1 * | 10/2010 | Bucuk ............................ 709/206 |
| 2011/0125925 | A1 * | 5/2011 | Bouthemy et al. ............ 709/250 |
| 2011/0219121 | A1 * | 9/2011 | Ananthanarayanan et al. ............................. 709/227 |
| 2011/0302324 | A1 * | 12/2011 | Karaoguz et al. ............. 709/246 |
| 2012/0158161 | A1 * | 6/2012 | Cohn et al. ...................... 700/90 |

FOREIGN PATENT DOCUMENTS

CN 100389602 C 5/2008
GB 2475279 5/2011

* cited by examiner

*Primary Examiner* — Vivek Srivastava
*Assistant Examiner* — Normin Abedin

(57) ABSTRACT

A remote information communication system comprises an administration server, at least one linking server and at least one remote device. The linking method of the remote information communication system comprises steps of: the administration server authenticating the remote device and linking server; the proximal device requesting the administration server to find out a specified remote device; the administration server responding an address of the linking server for establishing a link with the specified remote device; the proximal device linking with the linking server through the address responded from the administration server to find out the specified remote device via the linking server; and the linking server establishing a link between the proximal device and the specified remote device.

25 Claims, 11 Drawing Sheets

REMOTE INFORMATION COMMUNICATION SYSTEM AND LINKING METHOD THEREOF

FIELD OF THE INVENTION

The present invention relates to a remote information communication system and linking method thereof, particularly to a system and linking method thereof using an administration server to direct linking of at least one remote device, at least one linking server, and at least one proximal device.

BACKGROUND OF THE INVENTION

With advancement of network technology, many electronic products can access the Internet to have online services, such as remote control and online update. For example, a U.S. Pat. No. 6,373,851 disclosed a technology using the Ethernet to control electronic devices, wherein a communication system comprises a first communicating medium, an Ethernet polling server, and a plurality of Ethernet client stations. The Ethernet polling server has a transmitter connecting with the first communicating medium. The transmitter and the first communicating medium can bidirectionally communicate with each other. The Ethernet client stations interconnect with each other, and each of them has a transmitter containing a second communicating medium. The second communicating medium would not send any signal to the first communicating medium unless required by the Ethernet polling server. However, the second communicating medium can receive signals from the first communicating medium anytime. The prior art is based on a traffic controlling device and constrained by the minimum transmission rate and the maximum recommended distance of the Ethernet. Therefore, the prior art has a greater transmission range and can prevent from the transmission delay and collision of the terminal devices.

The Internet connection between proximal devices and terminal devices has been a very popular technology. If home electric appliances are intended to link with the network, they need wiring with network cables and thus consume more manpower. Therefore were developed technologies using the power network as the communication network. For example, a US publication No. 2005/0047379 disclosed a technology using wireless wideband or power cables to transmit audio/video contents. The device of the prior art has a content server receiving AV information and converting the information into PLC (Power Line Communication)-compatible signals. The device also has a PLC/UWB module able to establish a link with a signal transceiver of an electric appliance. Thereby, the electric appliance can receive information from the network and can be controlled by a remote device via the power lines without using any network cables.

A US publication No. 2004/0186908 also disclosed a PLC technology, wherein a power plug comprises AC power cords, network cables and a PLC adaptor. In another embodiment of the prior art, the power plug further has an AC/DC converter besides the AC power cords, network cables and PLC adaptor.

A China patent No. CN100389602 entitled "a camera system and a controlling method of the same" using a PLC technology for surveillance systems. In the prior art, a camera module connects with a PLC adaption module. The PLC adaption module receives the AV information recorded by the camera module, modulates the AV information and transmits the modulated AV information via the power lines. At the same time, the modulated signals received from the power lines are demodulated to obtain the control signals for controlling the camera module. The PLC adaption module includes a camera signal processing unit, a digital multimedia information compressing unit, an Ethernet adaption unit and a first PLC modulation/demodulation unit. The camera signal processing unit and the digital multimedia information compressing unit compress or convert the format of the image signals output by the camera module. The Ethernet adaption unit converts the signals into Ethernet signals. The first PLC modulation/demodulation unit loads the Ethernet signals on carrier waves able to be transmitted via the power lines. Thereby, the AV signals of the camera module can be transmitted to the monitoring side via the power lines.

The PLC technology exempts electric appliances from being wired with network cables and enables them to directly link with the network via power lines. In the conventional technology, the router assigns an IP (fixed IP or floating IP) to the electric appliance, and the electric appliance needs a server to allow the electric appliance side and the surveillance/control side (the user side) to exchange data. In the conventional technology, the surveillance/control side cannot link to the appliance unless it remembers the IP or domain name of the appliance or server. Further, the user has to renew the IPs or domain names by himself when the appliances or servers increase or when the IPs thereof are changed. The user should be very troubled by the complicated process. Furthermore, as the domain names or IPs of the electric appliances or servers are open to the public, they are likely to be sniffed or damaged by hackers. Therefore, the conventional remote surveillance/control technology still has some problems have to be overcome.

SUMMARY OF THE INVENTION

One objective of the present invention is to provide a network linking and device monitoring system having enhanced expandability and security to improve the conventional technology insufficient in expandability and security.

The present invention proposes a linking method of a remote information communication system. The linking method of the present invention comprises steps of: A. at least one remote device asking an administration server to provide an address of at least one linking server supporting the remote device through an Internet; B. the remote device registering the information thereof in the linking server according to the address provided by the administration server; C. a proximal device asking the administration server to find out a specified remote device through the Internet; D. the administration server responding to the proximal device with the address of the linking server that the specified remote device registers; E. the proximal device requesting the linking server to establish a link with the specified remote server according to the address of the linking server; and F. the linking server establishing a link between the proximal device and the specified remote device according to the request of the proximal device.

The present invention also proposes a remote information communication system to realize the above-mentioned linking method. The system of the present invention comprises an administration server, at least one linking server and at least one remote device, wherein one or more proximal devices can be linked with the system of the present invention. The administration server stores a server list and a device list. The linking server registers in the server list of the administration server through the Internet. The remote device requests the administration server to provide the addresses of the linking servers, and the remote device registers in the device list at the same time, whereby the administration server stores all the information of the linking servers and the remote devices. The administration server responds to the remote device with the address of one of the linking servers, so that the remote device registers the information thereof in one of the linking servers according the responded address. A proximal device requests the administration server to find out a specified remote device. The administration server provides a linking server that the specified remote device registers for the proximal device. The proximal device establishes a link with the specified remote device through the linking server provided by the administration server.

In some embodiments, the number of the administration servers can be increased according to using requirement. Each administration server stores a server list containing one or more linking servers and a device list containing one or more remote devices. Moreover, the number of the linking servers and the remote devices also can be increased persistently; when the number and linking information of the linking servers are changes, the server list and device list of the administration server can be updated to increase the apparatus to support them. The server list may include the linking servers respectively managed by different service providers. The administration server may assign the remote devices to register in different linking servers according to different service providers supporting the remote devices. The administration server may assign the remote devices to register in different linking servers according to different product types or geographic locations of the remote devices. The proximal device has an API (Application Programming Interface) for a user to address a request of finding out one of the remote devices. After the proximal device finds out the linking server that the specified remote device registers via the administration server, the proximal device requests the linking server to establish a link between the proximal device and the specified remote device. The linking server performs hole punching between the proximal device and the specified remote device at the first priority to establish point-to-point transmission. If the hole punching process fails, the linking server forwards the data packets between the proximal device and the specified remote device.

In the present invention, the remote device may be a security alarm device or a home electric appliance. The remote device periodically registers the information thereof in the linking server assigned by the administration server, whereby the linking server can regularly update the status of the remote device. When the remote device is changed or when the linking server that the remote device registers is changed, the remote device can again request the administration server to provide the address of at least one linking server supporting the remote device, and then the remote device can register the information thereof in the linking server provided by the administration server once again.

Via the technique set forth above, the remote device and the linking server needn't directly disclose the IP addresses and domain names thereof. Therefore, the present invention can reduce the risk of hacker invasion. Further, the proximal device can merely use the administration server to find out a linking server that a specified remote device registers, neither needing a fixed IP nor remembering the IP addresses or domain names of the linking servers. As long as a proximal device has API supported by the administration server, the user can request the administration server to find out the linking address. Furthermore, the present invention allows the manufacturers to expand or vary the quantities, specifications and types of the remote devices and the linking servers according to using requirement as long as registering in the administration server and updating the device list and the server list. Therefore, the manufacturers can vary the remote devices and the linking servers according to load of the apparatus.

DETAILED DESCRIPTION OF THE PREFERRED EMBODIMENTS

The present invention pertains to a remote information communication system and linking method thereof. The technical contents of the present invention are described in cooperation with the drawings below.

The remote information communication system of the present invention comprises at least one remote device, an administration server, and at least one linking server. The remote information communication system is requested by at least one proximal device to establish a link between the proximal device and the remote device. The linking method of the remote information communication system comprises steps of: A. at least one remote device requesting an administration server to provide an address of at least one linking server supporting the remote device via the Internet; B. the remote device registering the information thereof in the linking server according to the address provided by the administration server; C. a proximal device requesting the administration server to find out a specified remote device via the Internet; D. the administration server responding the address of the linker server that the specified remote device registers to the proximal device; E. a proximal device requesting the linking server to establish a link with the specified remote device according to the responded address; F. the linking server establishing a link between the proximal device and the specified remote device according to the request of the proximal device. The present invention has the following features: the linking server and the remote device needn't open the domain names or IPs to the public; all proximal devices can only request the administration server to find out a specified remote server; the administration server provides IP of the linking server for the proximal device; the proximal server requests the linking server to establish a link between the proximal device and the remote server. Thereby is reduced the probability that the linking server or the remote device is invaded by hackers. It is unnecessary for the proximal device to have a fixed IP or remember fixed IPs or domain names. Thus, the user of the proximal device is exempted from many technical problems of linking.

Figure 1:
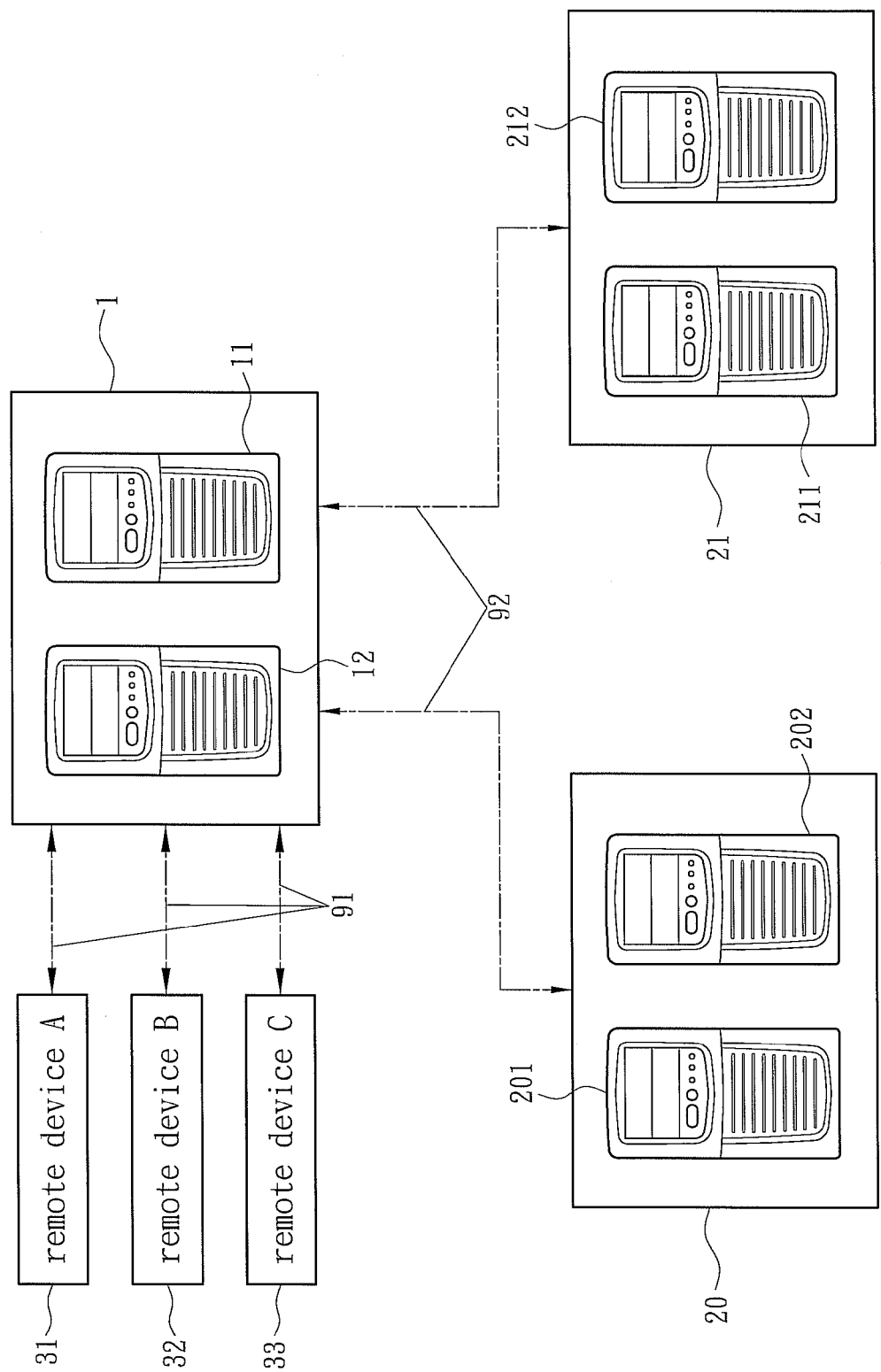
FIG. 1 is a first diagram schematically showing the architecture of a remote information communication system according to a first embodiment of the present invention.

In order to demonstrate the above-mentioned method in detail, the present invention further discloses a practical remote information communication system, which comprises at least one administration server, at least one linking server and at least one remote device. Refer to FIG. 1 a diagram schematically showing the architecture of a remote information communication system according to one embodiment of the present invention. As shown in FIG. 1, two administration servers 11 and 12 constitute an administration server group 1 that back up with each other. Each of the administration servers 11 and 12 stores a device list and a server list. The device list stores the data of a plurality of remote devices allowed for registering. The server list stores the information of a plurality of linking servers. In one embodiment, the server list contains a plurality of linking servers managed by different service providers. In one embodiment, the server list contains a plurality linking servers supporting different types of devices. In one embodiment, the server list contains a plurality linking servers distributed at different geographic locations. In one embodiment, the device list and the server list have a mapping relationship therebetween. As shown in FIG. 1, the remote information communication system includes a linking server 201 and a linking server 211. In this embodiment, the linking server 201 and a linking server 202 are respectively managed by different service providers. As shown in FIG. 1, the linking server 201 and the linking server 202 constitute a linking server group A (20) that back up with each other. Similarly, the linking server 211 and a linking server 212 constitute a linking server group B (21) that back up with each other. In order to describe the present invention conveniently, the administration server group 1, the linking server group A (20) and the linking server group B (21) are used to represent the servers of the linked targets thereinafter. The remote information communication system also includes a remote device A (31), a remote device B (32) and a remote device C (33). As stated hereinbefore, the device list stores the information of a plurality of remote devices. The remote devices A, B and C (31, 32 and 33) respectively have their unique IDs. The information of the service providers managing the remote devices A, B and C (31, 32 and 33) are stored in the device list of the administration server group 1 beforehand. When the linking server group A (20), linking server group B (21), remote device A (31), remote device B (32) and remote device C (33) has just accessed the Internet, the linking server group A (20) and linking server group B (21) transmit server-register information 92 to the administration server group 1 via the Internet to register the IPs and configurations thereof (such as the specifications, linking states, etc.). The administration server group 1 then verifies whether the linking server group A (20) and linking server group B (21) are the legal server groups pre-stored in the server list. If they are legal server groups, the administration server group 1 respectively responds to the linking server group A (20) and linking server group B (21) that their registers are done. When the remote device A, B or C (31, 32 or 33) intend to find out servers able to support them, it sends out linking server requesting information 91 to the administration server group 1 via the Internet. The administration server group 1 then verifies whether the remote device A, B or C (31, 32 or 33) is the legal device pre-stored in the device list. If the remote device A, B or C (31, 32 or 33) is a legal device, the administration server group 1 responds linked targets to it.

In practical application, the linking server group A (20) and the linking server group B (21) may be respectively managed by different service providers. In such a case, the administration server group 1 would assign the remote device A (31) to the linking server group A (20), which is managed by the service provider supporting the remote device A (31). Similarly, the administration server group 1 assigns the remote device B (32) and the remote device C (33) to the linking server group B (21) which is managed by the service provider supporting the remote device B (32) and the remote device C (33). In one embodiment, the remote devices A, B and C (32, 32 and 33) respectively belong to different types of products, and the administration server group 1 respectively assigns them to the linking server group A (20) and the linking server group B (21). In one embodiment, the remote devices A, B and C (31, 32 and 33) are respectively at different geographic locations, and the administration server group 1 assigns each to the nearer linking server group A (20) or nearer linking server group B (21).

Figure 2:
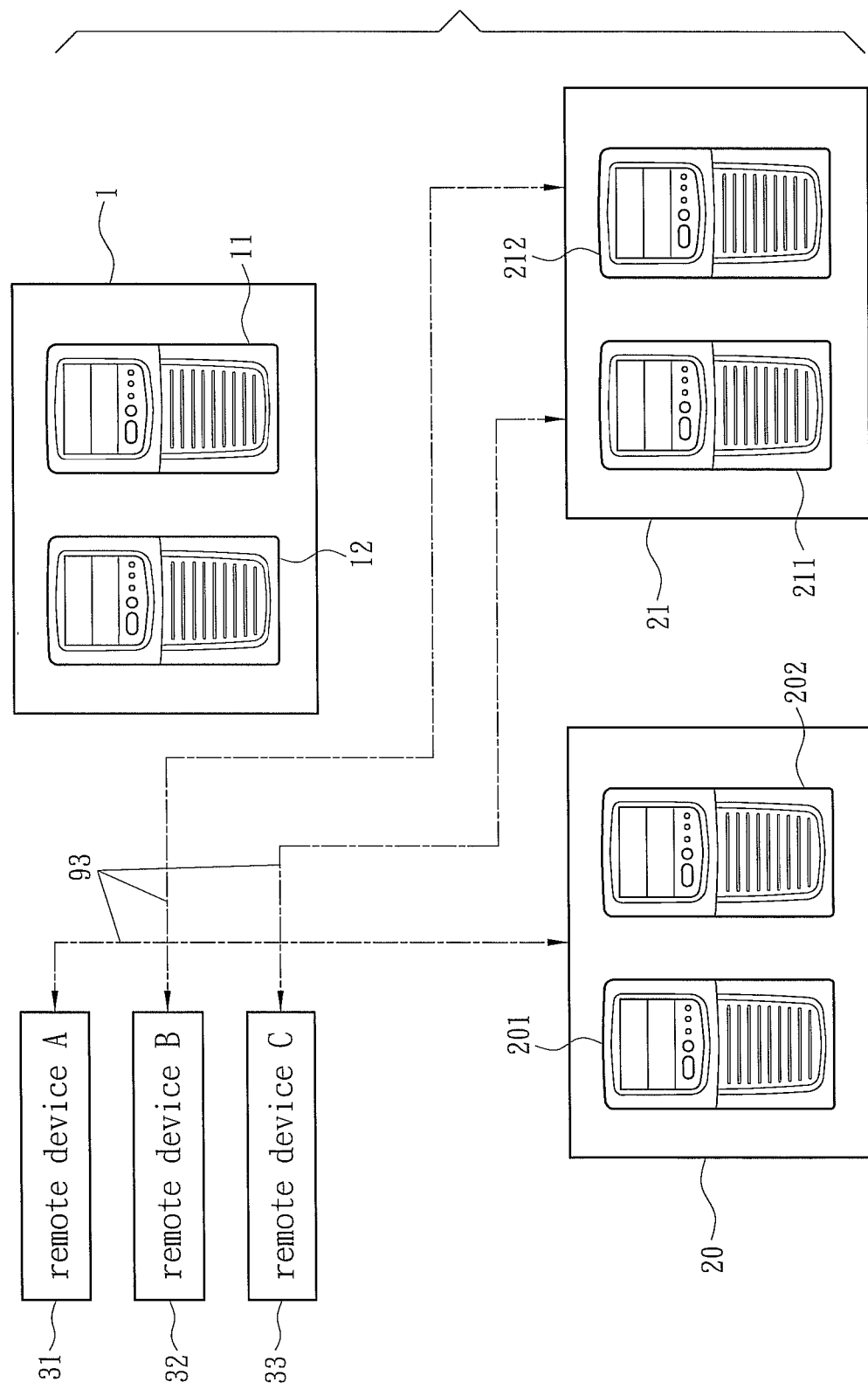
FIG. 2 is a second diagram schematically showing the architecture of a remote information communication system according to the first embodiment of the present invention.

Refer to FIG. 2. According to the linking address the administration server group 1 responds to the remote device A (31), the remote device A (31) links to the linking server group A (20) and registers the information thereof in the linking server group A (20), whereby the linking server group A (20) learns IP of the remote device A (31). According to the linking address the administration server group 1 responds to the remote device B (32) and the remote device C (33), the remote device B (32) and the remote device C (33) link to the linking server group B (21) and registers the information thereof in the linking server group B (21) whereby the linking server group B (21) learns IPs of the remote device B (32) and the remote device C (33).

Figure 3:
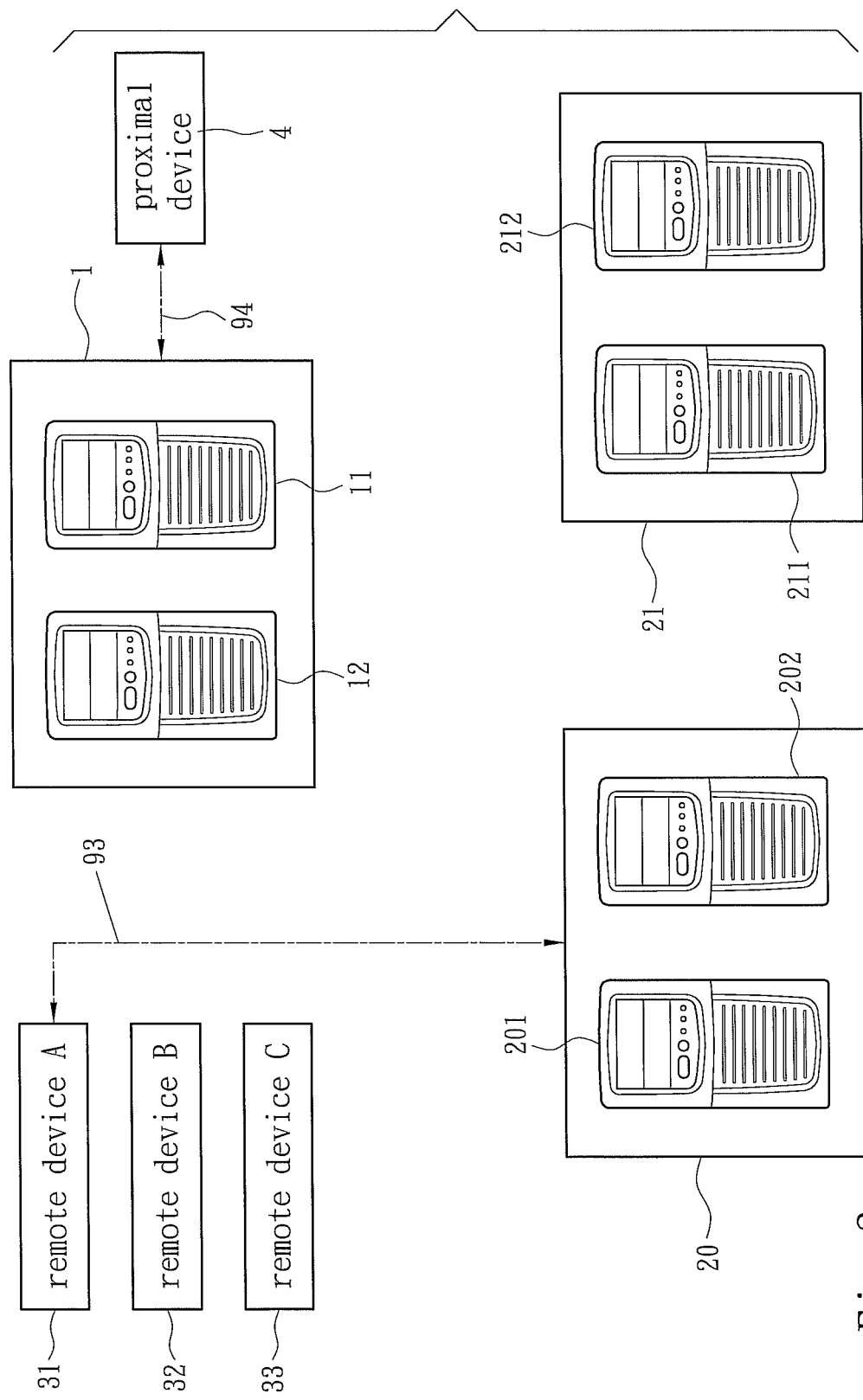
FIG. 3 is a third diagram schematically showing the architecture of a remote information communication system according to the first embodiment of the present invention.
Figure 4:
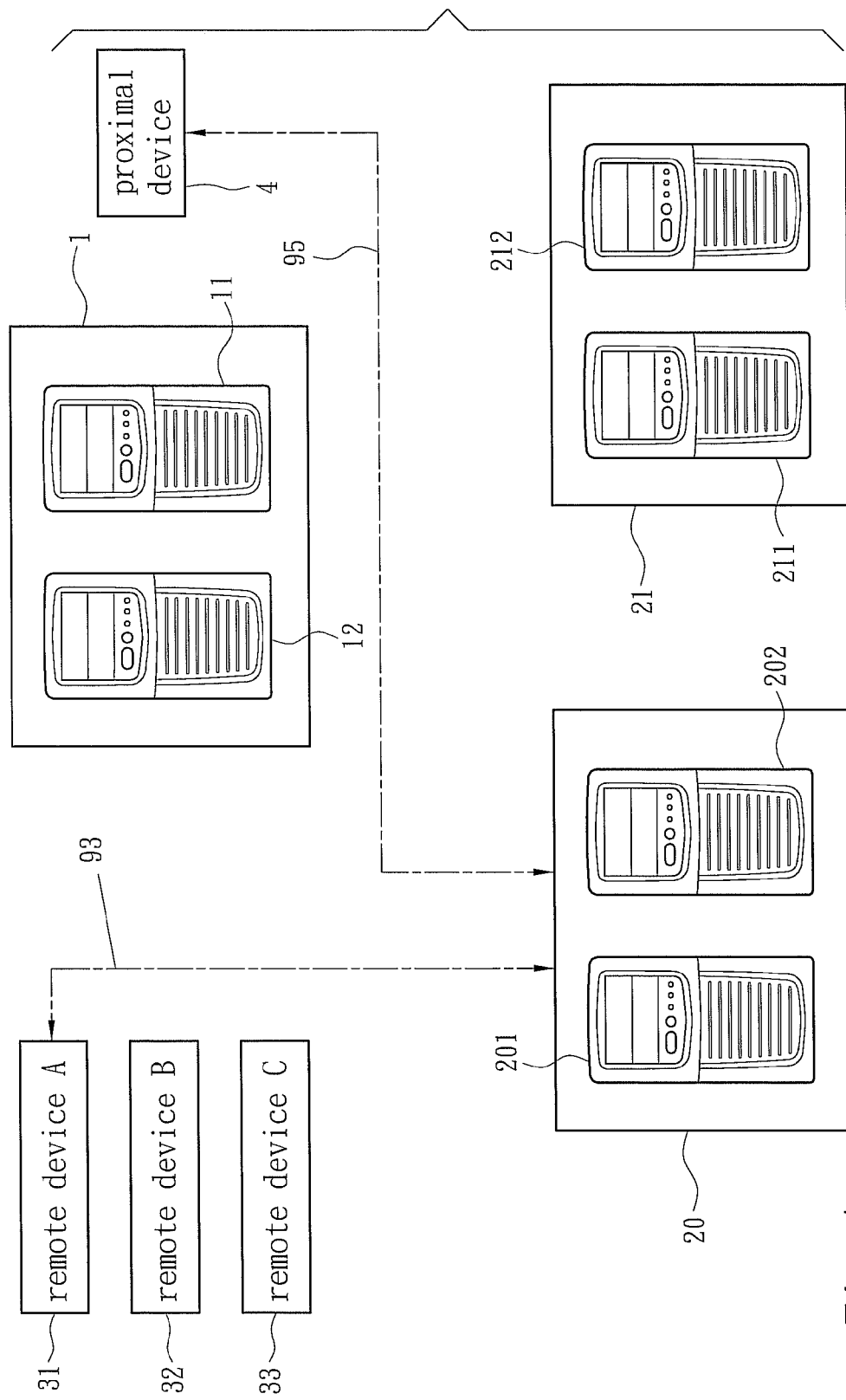
FIG. 4 is a fourth diagram schematically showing the architecture of a remote information communication system according to the first embodiment of the present invention.
Figure 5:
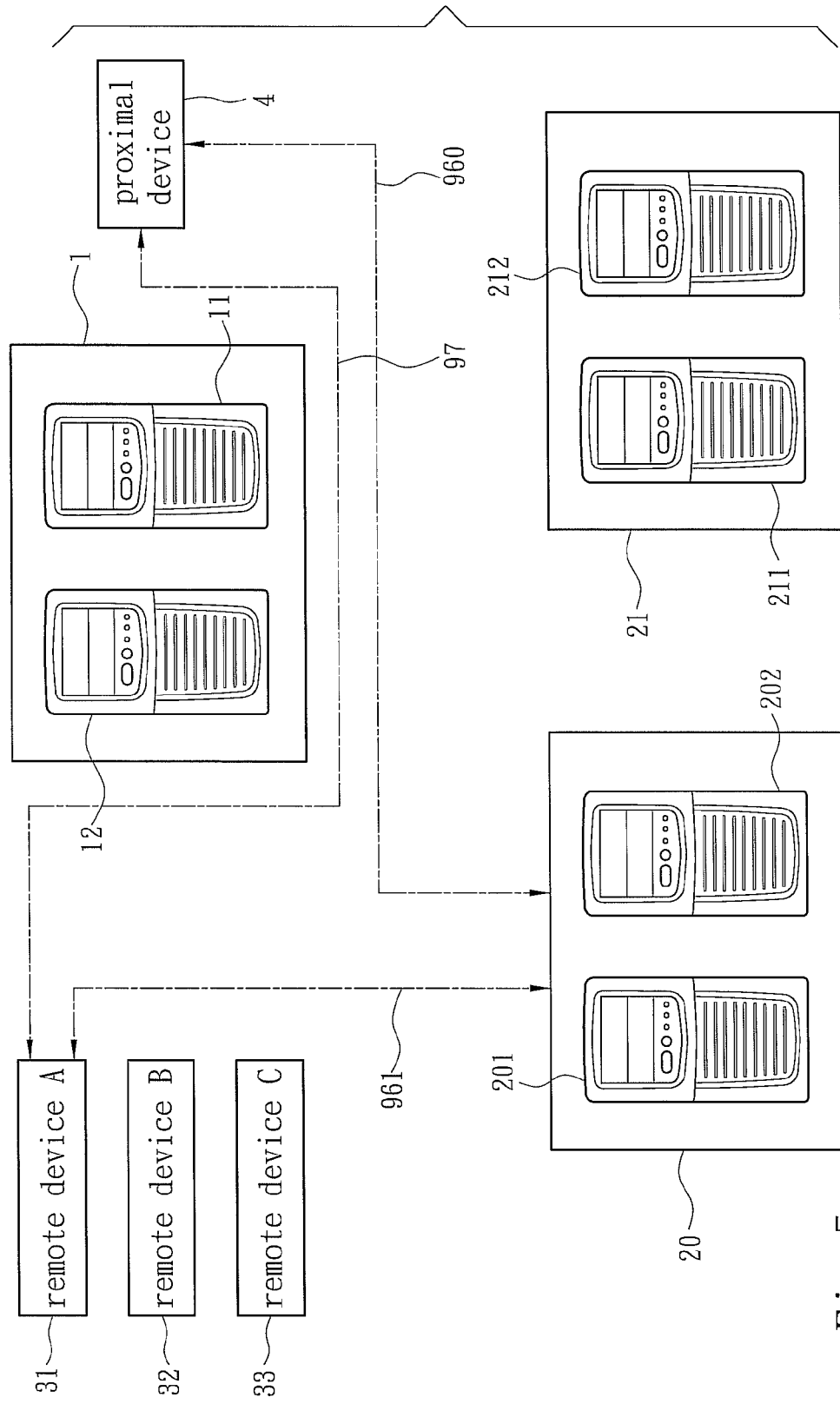
FIG. 5 is a fifth diagram schematically showing the architecture of a remote information communication system according to the first embodiment of the present invention.
Figure 6:
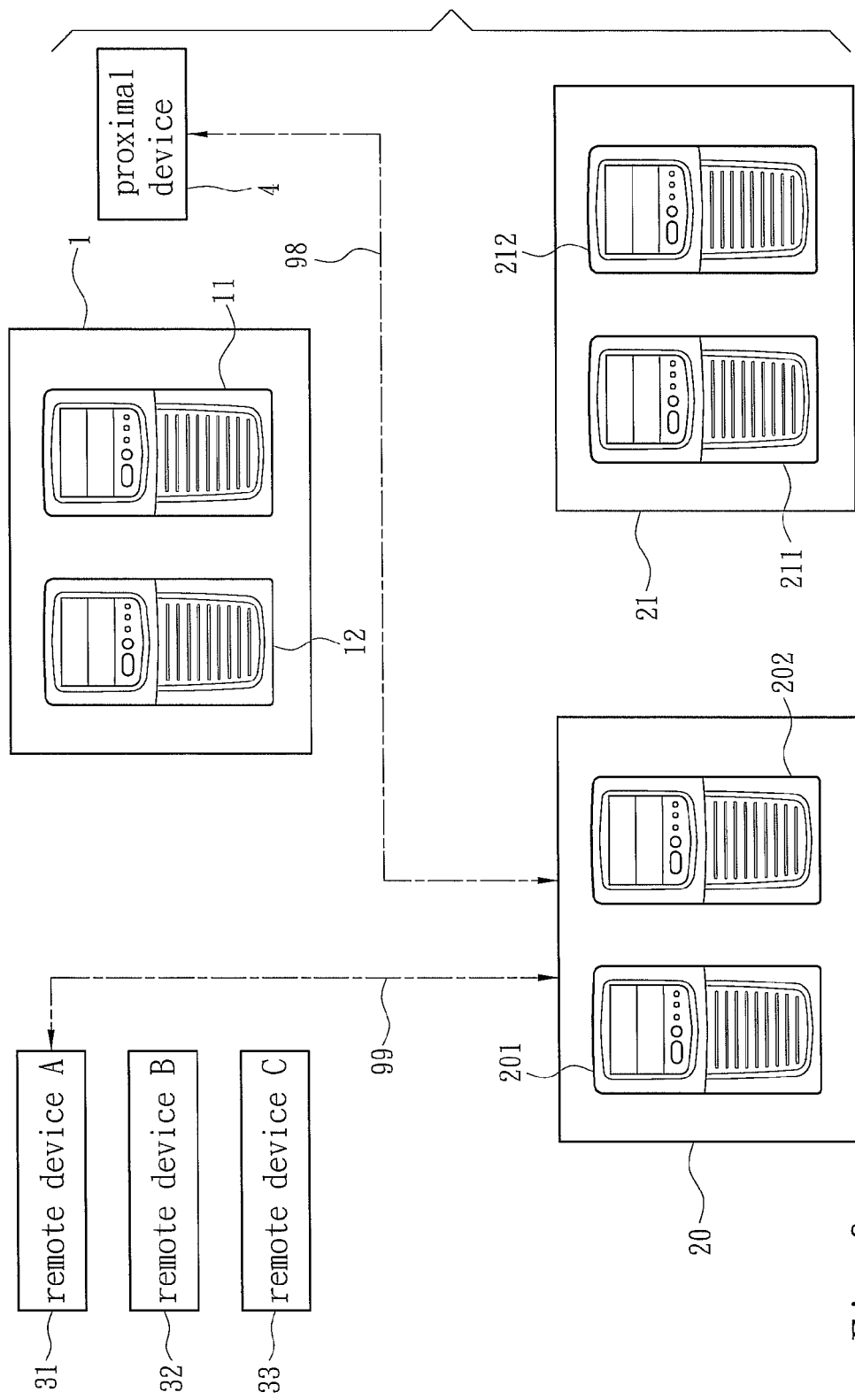
FIG. 6 is a sixth diagram schematically showing the architecture of a remote information communication system according to the first embodiment of the present invention.

Refer to FIG. 3. The remote information communication system of the present invention can accept one or more proximal devices 4 linked thereto. The proximal devices 4 need API (Application Programming Interface) supporting the linking to the administration server group 1. The proximal device 4 can select a specified remote device via API. Suppose that the proximal device 4 chooses the remote device A (31) as the linked target via API. The proximal device 4 sends a linked target requesting information 94 to the administration server group 1 via API to ask which linking server group can link the proximal device 4 to the remote device A (31). The administration server group 1 provides the location of the linking server group A (20) that the specified remote device A (31) registers. Via API, the proximal server 4 links to the linking server group A (20) according to the location that the administration server group 1 responds to the proximal device 4. Then, the proximal device 4 sends link requesting information 95 to the linking server group A (20) for being linked to the remote device A (31). Refer to FIG. 5. The linking server group A (20) takes priority to use the hole punching technology and respectively sends hole-punching information 960 and hole-punching information 961 to the proximal device 4 and the remote device A (31) so as to establish a point-to-point link 97 between the proximal device 4 and the specified remote device A (31). The proximal device 4 can obtain the information of the remote device A (31) or control the remote device A (31) via the point-to-point link 97. Refer to a U.S. publication No. 2009/0100309 and a GB publication No. 2475279 for the hole punching technology. As the hole punching technology is not a technical feature of the present invention but a prior art, it does not repeat herein. Refer to FIG. 6. If the linking server group A (20) does not complete the hole punching process, the linking server group A (20) forwards data packets between the proximal device 4 and the specified remote device A (31).

The proximal device 4 cannot obtain the IPs of the linking server group A (20) and the linking server group B (21) unless via the administration server group 1. Therefore, the variation of IP or mechanical specification of the linking server group A (20) and the linking server group B (21) would not hinder the proximal device 4 from finding a linked target. Favored by the abovementioned feature, the architecture of the linking server group (such as quantity, specification, type, etc.) can be modified according to the market requirement. For example, when some type of products increases on line, the linking servers supporting the type of products can be increased to meet the load capacity required by the type of products. When new linking server groups are added, or when the linking information (such as IP) is varied, or when the number of the machines inside a linking server group is varied, what needs doing is only renewing the server list and making the linking server group send the server-register information 92 to register in the administration server group 1 again. When the number or type of the remote devices is varied or when the linking server group that the remote device registers is varied, the device list has to be updated and the remote device has to request the linking server groups with the information of the linking server groups.

Figure 7:
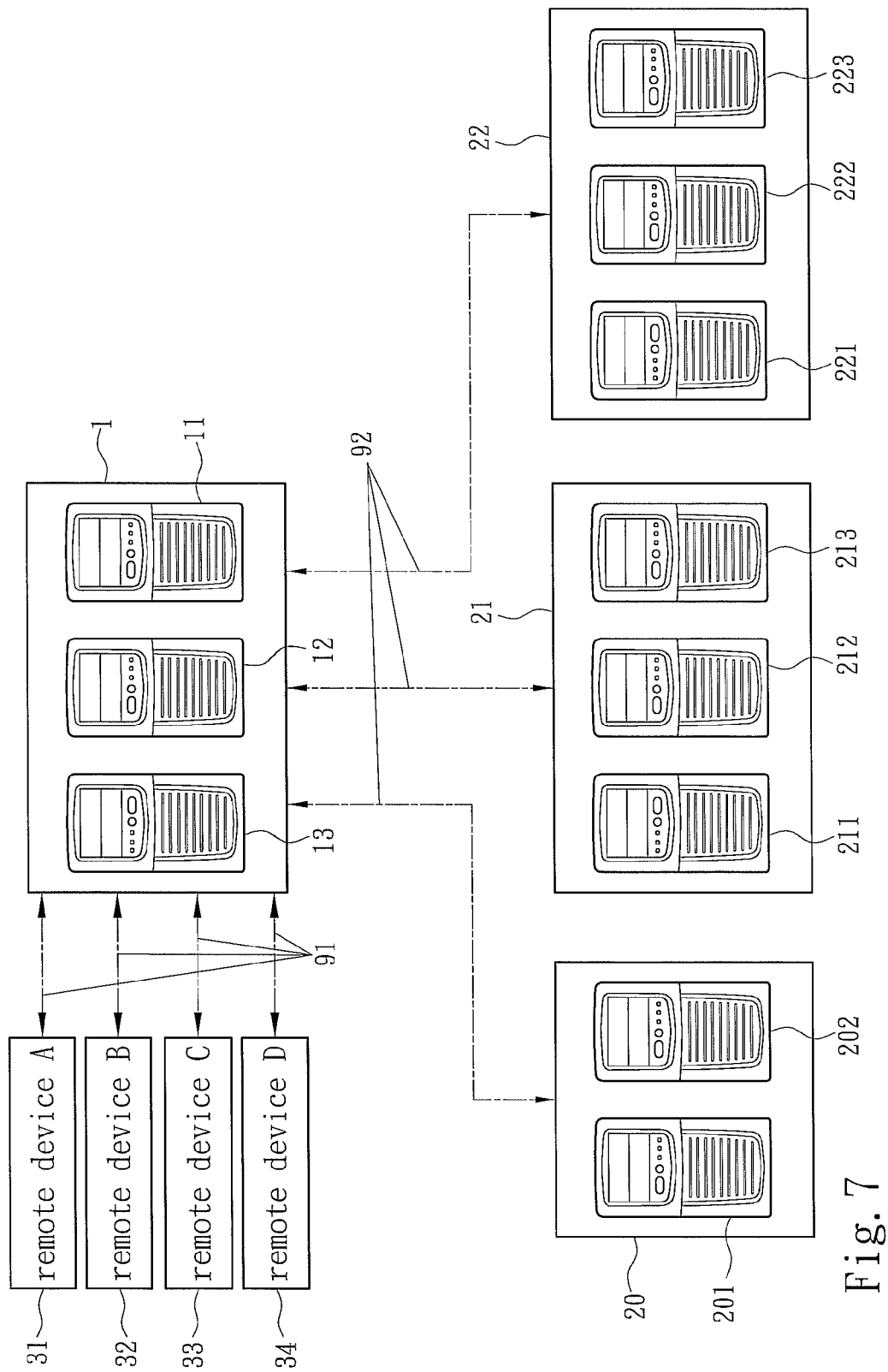
FIG. 7 is a seventh diagram schematically showing the architecture of a remote information communication system according to the first embodiment of the present invention.

Refer to FIG. 7 a diagram schematically an embodiment of expanding the remote information communication system. In this embodiment, a remote device D (34) is added to the system. In the present invention, the number or addresses of the supported remote devices can be varied via renewing the device list of the administration server group 1. The remote devices A-D (31-34) can ask and learn new available linking server groups via sending the linking server requesting information 91 to the administration server group 1 again. As shown in FIG. 7, a new linking server 213 is added to the linking server group B (21), and a new linking server group C (22) consisting of linking servers 221, 222 and 223 is added to the system. Similarly, the content of the linking servers of the remote information communication system is expanded via renewing the server list of the administration server group 1 in this embodiment. In the present invention, the quantities, specifications and types of the remote devices or linking servers can be expanded or varied according to requirement via only renewing the server list or device list and registering in the administration server group 1 once more. Thereby, the manufacturers can easily vary the load capacity of the system according to requirement.

Figure 8:
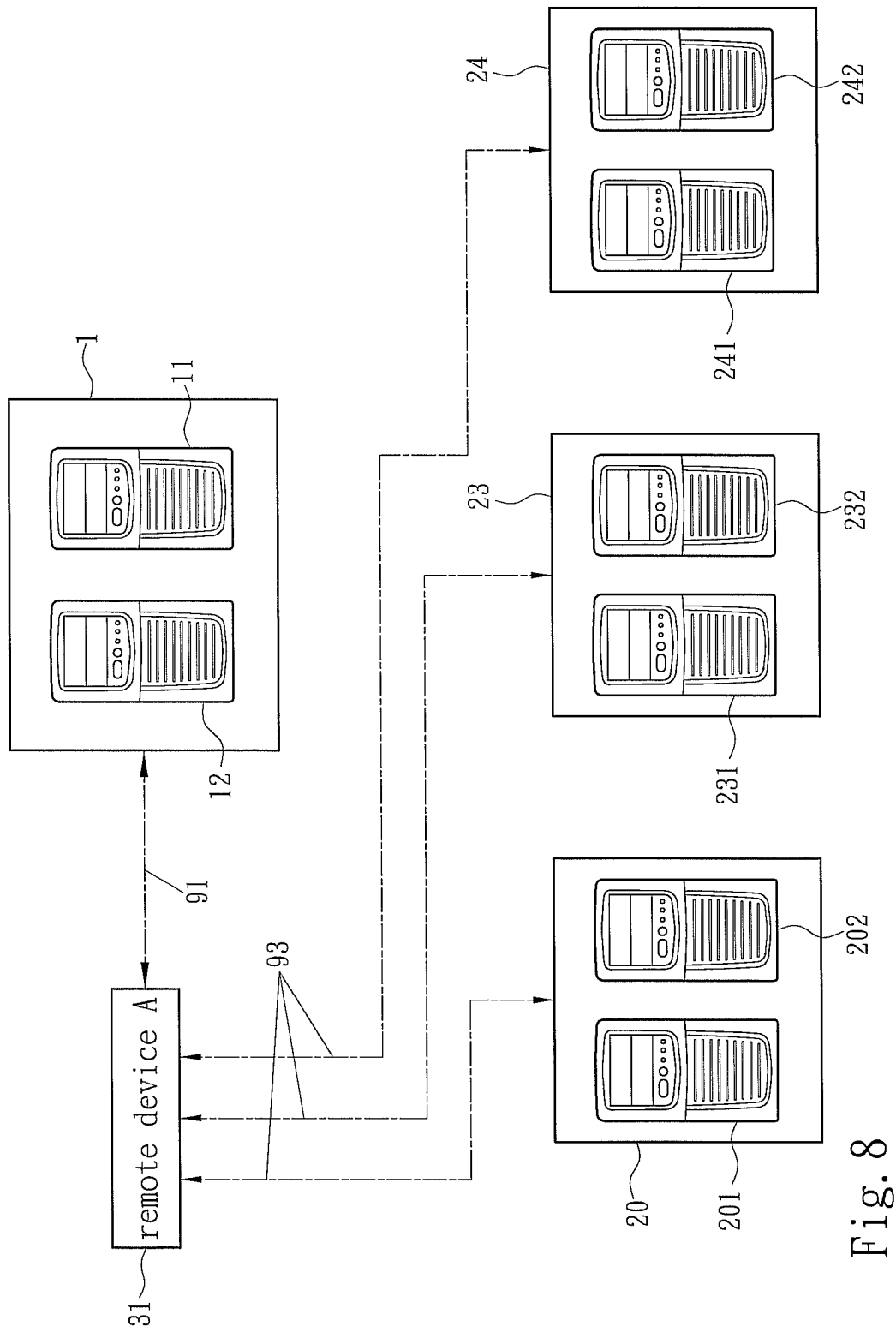
FIG. 8 schematically shows that a remote device registers in a plurality of linking server groups according to one embodiment of the present invention.

The remote information communication system of the present invention allows an identical remote device to register in several different linking servers. As shown in FIG. 8, the remote information communication system includes the linking server groups A, D and E (20, 23, and 24). The linking server group D (23) includes linking servers 231 and 232. The linking server group E (24) includes linking servers 241 and 242. After the remote device A (31) sends the linking server requesting information 91 to the administration server group 1, the administration server group 1 responds to the remote device A (31) that it can register in the server groups A, D and E (20, 23, and 24). Favored by the feature, the server groups A, D and E (20, 23, and 24) can jointly support the remote device A (31). When the linking server group A (20) is out of order or off-line, the remote device A (31) can still register in the linking server group D (23) or the linking server group E (24). Further, if the remote device A (31) is a mobile one, the administration server group 1 may assign the remote device A (31) to a linking server group nearest to the remote device A (31).

The mapping relationship between the remote devices and the linking server groups is shown in Table.1.

TABLE 1 the mapping relationship between the remote devices and the linking server groups

| | Codes of Linking Servers | Serial Numbers of Remote Devices | Notes |
|---|---|---|---|
| Service Provider A | Ser 01 | D01, D02, D03, D04, D05 | Ser 01: Shanghai |
| | Ser 02 | | Ser 02: Tokyo |
| | Ser 03 | | Ser 03: Los Angeles |
| | Ser 04 | D06, D07, D08, D09 | Ser 04: New York |
| | Ser 05 | | Ser 05: Berlin |
| Service Provider B | Ser 11 | D11, D12, D13, D14 | Ser 11: Paris |
| | Ser 12 | | Ser 12: Cairo |

In the example shown in Table.1, the server list of the administration server stores the linking servers Ser 01-Ser 05 managed by Service Provider A and the linking servers Ser 11-Ser 12 managed by Service Provider B. Remote devices D01-D05 are assigned to register in the linking servers Ser 01-Ser 03. D01-D05 are respectively the serial numbers of remote devices. As mentioned above, each remote device has a unique serial number, whereby the administration server or the linking server can verify or recognize the remote device. Requested by proximal devices, the linking servers Ser 01-Ser 03 establish links between the proximal devices and the remote devices D01-D05. As the linking servers Ser 01-Ser 03 have identical functions, they can back up with each other. The linking servers Ser 01-Ser 03 can be respectively arranged in different geographic locations. For example, the linking servers Ser 01-Ser 03 are respectively located in Shanghai, Tokyo and Los Angeles, whereby the remote devices D01-D05 can register in the nearer linking servers. Similarly, remote devices D06-D09 are assigned to register in the linking servers Ser 04-Ser 05. Remote devices D11-D14 are assigned to register in the linking servers Ser 11-Ser 12 managed by Service Provider B. When the remote device D01 accesses the Internet to ask the administration server a linking server, the administration server can simultaneously provide the addresses of the linking servers Ser 01-Ser 05 for the remote device D01, whereby the remote device D01 can find a normal linking server anytime.

In the remote information communication system, the linking server groups back up with each other. Moreover, there are a plurality of linking servers in one linking server group, thus the present invention is formed in a multi-backup structure. Therefore, the present invention is very stable and still operates well even when there are few malfunctions occurring.

Figure 9:
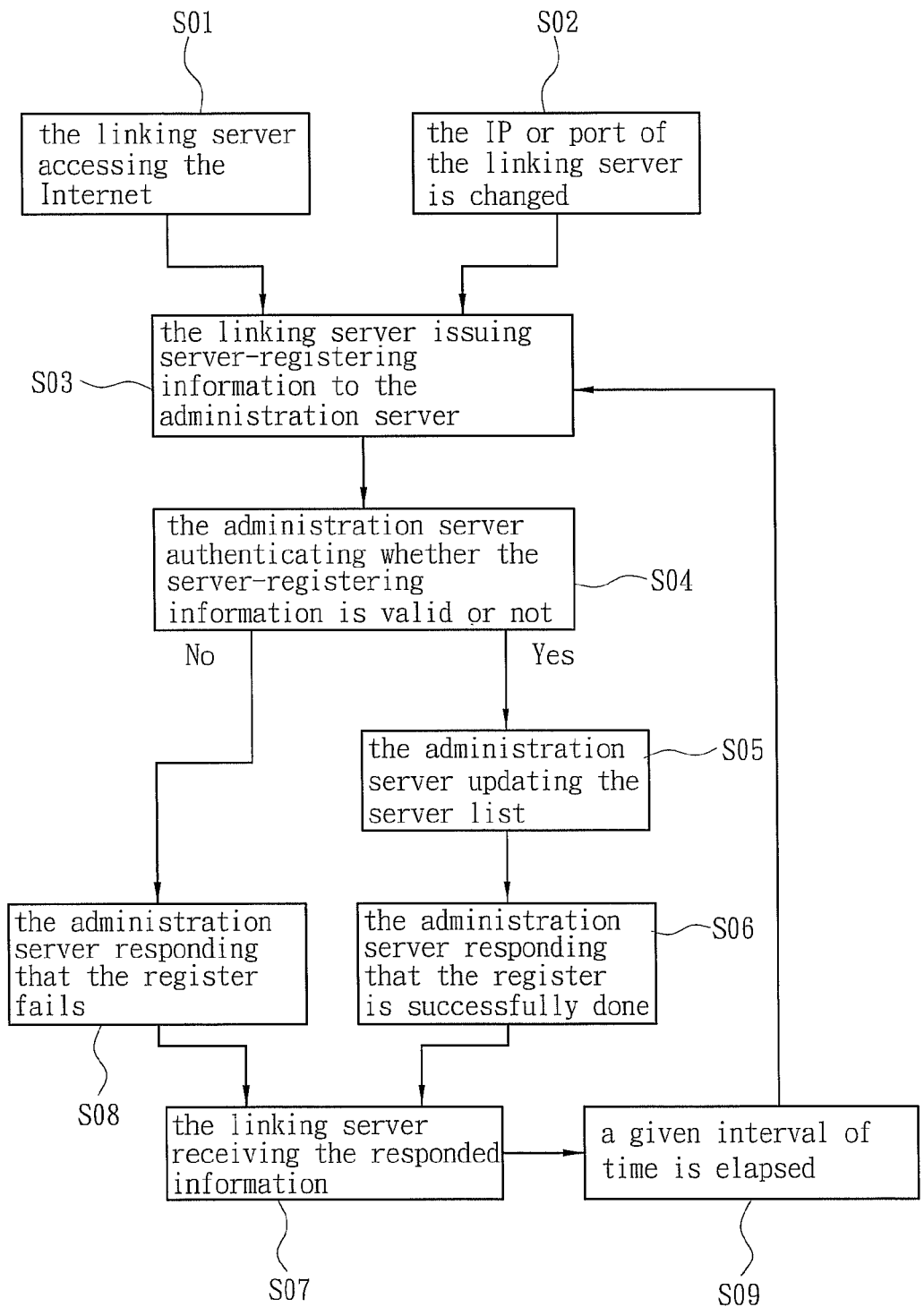
FIG. 9 shows a flowchart of the connection and interaction of a linking server and an administration server according to one embodiment of the present invention.

Refer to FIG. 9 showing a flowchart of the operation of the linking servers and the administration server. When one or more linking servers access the Internet (Step S01) or when the IPs or ports of one or more linking servers are varied (Step S02), the linking server connects with the administration server via the Internet and transmits a piece of server-registering information to the administration server (Step S03).

The administration server verifies the server-registering information and determines whether the linking server is legal in the server list (Step S04). If the linking server is determined to be legal in the server list, the administration server renews the server list according to the server-registering information (Step S05) and acknowledges the linking server that the register is done (Step S06). Thus, the linking server receives the acknowledge (Step S07). In order to guarantee that the administration server records the latest status of the linking server group, Step S03 is executed periodically (Step S09). If the register is unsuccessful in Step S04, it means that linking server does not exist in the server list and is an illegal linking server. In such a case, the administration server acknowledges the linking server that register fails (Step S08), and the linking server receives the acknowledge (Step S07).

Figure 10:
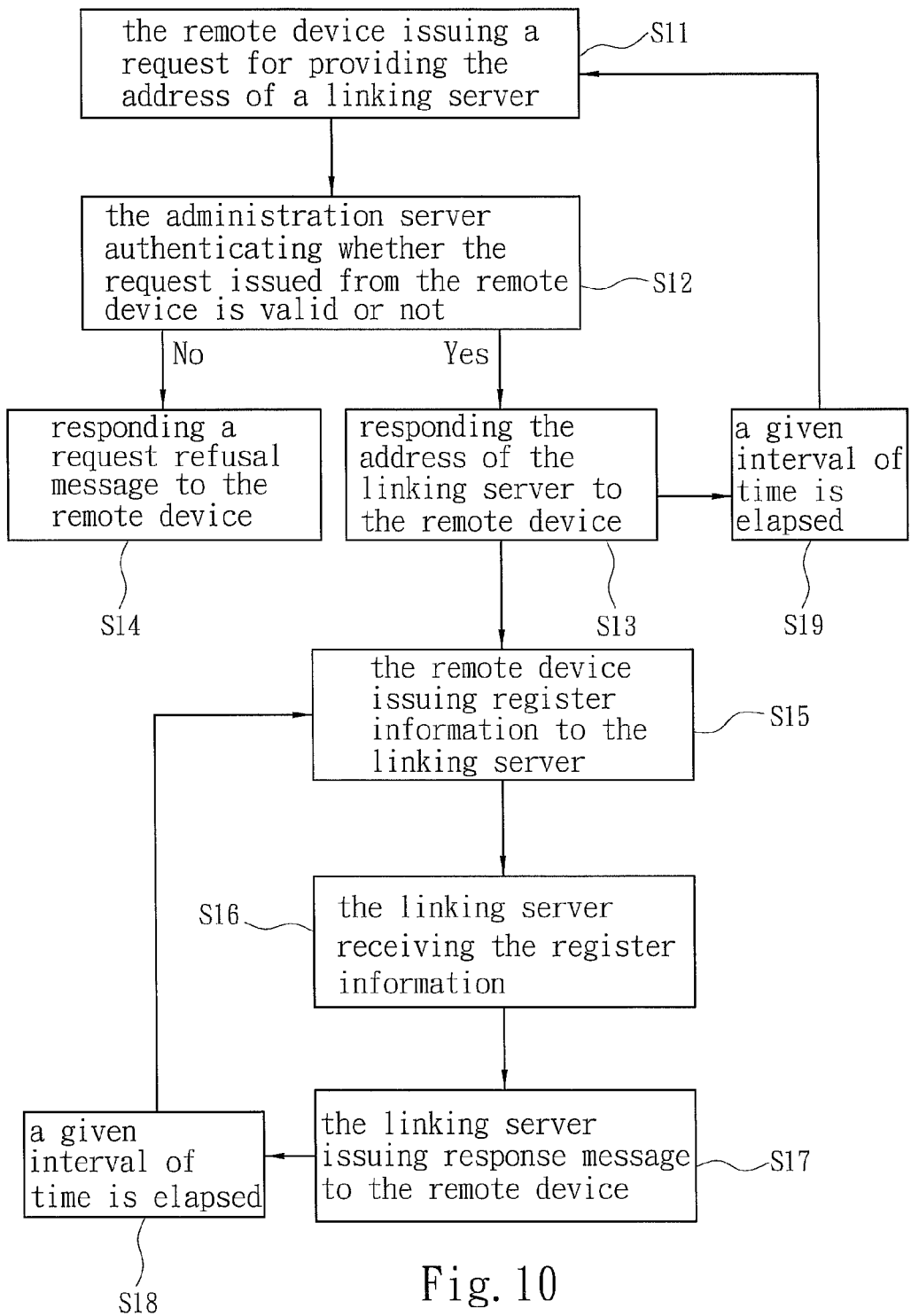
FIG. 10 shows a flowchart of the connection and interaction of a remote device and a linking server according to one embodiment of the present invention.

Refer to FIG. 10 showing a flowchart of the process that a remote device accesses the Internet to ask the administration server to provide linking servers. Firstly, the remote device sends a request to the administration server for providing the address of a linking server (Step S11). Next, the administration server examines whether the request is valid (Step S12). If the request is valid, the administration server responds to the remote device the addresses of the linking servers (Step S13). If the request is invalid, the administration server responds to the remote device a refusal message (Step S14). Next, the remote device connects with the linking server provided by the administration server. The remote device sends a piece of device-registering information to the linking server (Step S15), and the linking server receives the device-registering information (Step S16). Next, the linking server sends a response to the remote device (Step S17). Thus, the linking server learns the IP and information necessary for communicating with the remote device. To guarantee that the linking server can access the remote device, the remote device returns to Step S11 periodically to resend the information thereof to the linking server (Step S18). The period may be preset to be 10 minutes. Thereby, the linking server can frequently learn the latest status of the remote device. By a longer period, the remote device periodically requests the administration server to provide the latest addresses and related information of the linking servers (Step S19). The longer period may be preset to be 24 hours.

Figure 11:
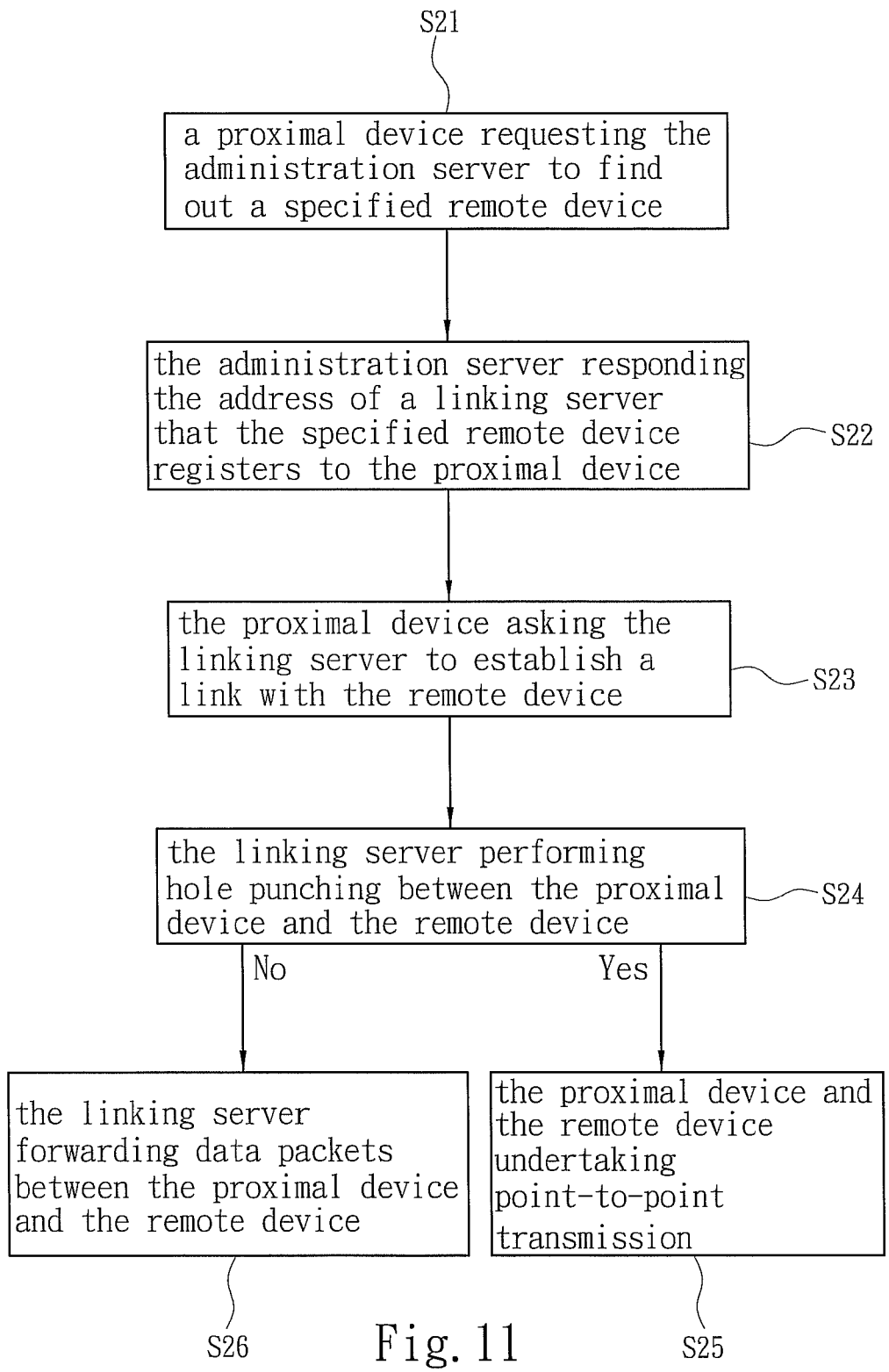
FIG. 11 shows a flowchart of the connection and interaction of a proximal device and a remote device according to one embodiment of the present invention.

Refer to FIG. 11 showing a flowchart of the process that the user uses a proximal device to ask for connecting with a remote device. The user uses API of a proximal device to select a specified remote device. Then, the proximal device requests the administration sever to find out the specified remote device via API (Step S21). The administration server responds to the proximal device with the address of a linking server that the remote device registers (Step S22). Thus, the proximal device learns the linking server whereby it can connects with the specified remote device. Next, the proximal device asks the linking server to establish a link between the proximal device and the remote device (Step S23). The linking server takes priority to perform a hole punching process on the proximal device and the remote device (Step S24). If the hole punching process is successful, the proximal device and the remote device undertake point-to-point transmission (Step S25). If the hole punching process fails, the linking server forwards data packets between the proximal device and the remote device (Step S26).

Via the technique set forth above, the remote device and the linking server needn't directly disclose the IPs and domain names thereof. Therefore, the present invention can reduce the risk of hacker invasion. Further, the proximal device can merely use the administration server to find out a linking server that a specified remote device registers, neither needing a fixed IP nor remembering the IP addresses or domain names of the linking servers. As long as a proximal device has an API supported by the administration server, the user can merely select a remote device to request the administration server to find out the linking address. The remaining procedures, such as interactions with the administration server and the linking server, are all automatically executed by API. Therefore, the present invention can greatly reduce complexity of operation. Furthermore, the present invention allows the manufacturers to vary the quantities, specifications and types of the remote devices and the linking servers as long as the manufacturers log in the administration server and update the device list and the server list. Therefore, the manufacturers can vary the quantities, specifications and types of the remote devices and the linking servers according to load of the apparatuses. In the present invention, the remote devices may be security apparatuses (such as surveillance cameras, anti-theft systems, and smoke/fire alarms) or home electric appliances (such as refrigerators and air-conditioners). In the present invention, the proximal devices should be devices having AV playing functions, such as mobile phones, computers, and personal digital assistants, which are able to play AV information.

The embodiments described above are only to exemplify the present invention but not to limit the scope of the present invention. Any equivalent modification or variation according to the spirit of the present invention is to be also included within the scope of the present invention.

In conclusion, the present invention possesses utility, novelty and non-obviousness and meets the condition for a patent. Thus, the Inventors file the application for a patent. It is appreciated if the patent is approved fast.

What is claimed is:

1. A linking method of an information communication system, comprising steps of:
    by an administration server, receiving a first request of a remote device via an Internet;
    by the administration server, in response to the first request of the remote device, assigning at least one linking server from a plurality of linking servers and providing the remote device with an address of the assigned linking server via the Internet, wherein the remote device links to and registers information of the remote device in the assigned linking server according to the address provided by the administration server, and wherein the remote device periodically requests the administration server to re-execute the assigning step and the providing step;
    by the administration server, responding to a second request of a proximal device for connecting to the remote device, providing the proximal device with the address of one of the assigned linking servers to which the remote device is registered via the Internet, wherein the proximal device sends a third request to the assigned linking server according to the address provided by the administration server; and
    by the assigned linking server, in response to the third request of the proximal device, facilitating establishment of a point-to-point (P2P) connection between the proximal device and the remote device.

2. The linking method according to claim 1, wherein the administration server is one of a plurality of administration servers that constitutes a administration server group, and wherein the administration servers in the identical administration server group back up to each other, and each administration server stores a server list for recording information of one or more linking servers and a device list for recording information of one or more remote devices.

3. The linking method according to claim 1, wherein the administration server assigns more than one linking servers to the remote device in response to the first request, and the remote device registers to these more than one linking servers.

4. The linking method according to claim 3, wherein the administration server, in response to the second request of the proximal device for connecting to the remote device, selects one linking server from the more than two linking servers that the remote device registers in and informs said one linking server to the proximal device.

5. The linking method according to claim 1, wherein the administration server provides different addresses for the remote devices at different geographic locations to register in the different linking servers.

6. The linking method according to claim 1, wherein the plurality of linking servers constitute a linking server group, and wherein the linking servers in the identical linking server group back up to each other.

7. The linking method according to claim 1, wherein the administration server updates a server list and a device list to increase or change the linking servers or the remote devices.

8. The linking method according to claim 1, wherein the proximal device includes an application programming interface for sending the second request and the third request.

9. The linking method according to claim 1, wherein the P2P connection between the proximal device and the remote device is established by hole punching performed by the linking server.

10. The linking method according to claim 1, wherein the remote device periodically updates and registers the information thereof in the linking server that is assigned by the administration server.

11. The linking method according to claim 1, wherein when the remote device again requests the administration server to provide the address of at least one linking server supporting the remote device, the remote device again links and registers the information thereof in the linking server according to the address provided again.

12. The linking method according to claim 1, wherein the remote device is a security alarm device.

13. The linking method according to claim 1, wherein the remote device is a home electric appliance.

14. The linking method according to claim 1, wherein the proximal device is equipped with an audio/video playing function.

15. An information communication system, comprising:
an administration server; and
a plurality of linking servers connected to the administration server, for establishing point-to-point (P2P) connections, wherein the administration server, in response to a request of a remote device, assigns at least one linking server from the plurality of linking servers to a remote device and provides the remote device with an address of the assigned linking server via an Internet, and the remote device links and registers information of the remote device in the assigned linking server according to the address provided by the administration server; wherein a proximal device requests the administration server to provide the address of one of the assigned linking server corresponding to the remote device via the Internet, and the proximal device communicates with the assigned linking server according to the address provided by the administration server to establish a P2P connection between the proximal device and the remote device, and wherein the remote device periodically requests the administration server to re-provide the address for the remote device to register.

16. The information communication system according to claim 15, wherein the administration server is one of a plurality of administration servers that constitute an administration server group, and wherein the administration servers in the identical administration server group back up to each other, and each administration server stores a server list for recording information of one or more linking servers and a device list for recording information of one or more service devices.

17. The information communication system according to claim 15, wherein the plurality of linking servers constitute a linking server group, and wherein the linking servers in the identical linking server group back up to each other.

18. The information communication system according to claim 17, wherein the linking servers are managed by different service providers.

19. The information communication system according to claim 17, wherein the linking servers support different remote devices with different product types.

20. The information communication system according to claim 17, wherein the linking servers are located at different geographic locations.

21. The information communication system according to claim 15, wherein the proximal device includes an application programming interface for a user to address a request of finding out the linking server of the remote device.

22. The information communication system according to claim 15, wherein the P2P connection between the proximal device and the remote device is established by hole punching performed by the linking server.

23. The information communication system according to claim 15, wherein the remote device is a security alarm device.

24. The information communication system according to claim 15, wherein the remote device is a home electric appliance.

25. The information communication system according to claim 15, wherein the proximal device is equipped with an audio/video playing function.

* * * * *